US012452143B2

(12) United States Patent
Divakara

(10) Patent No.: US 12,452,143 B2
(45) Date of Patent: Oct. 21, 2025

(54) SYSTEM AND METHOD FOR IDENTIFYING PERFORMANCE ISSUES WITH SERVICE PROVIDERS THAT PROVIDE A SERVICE TO SUPPORT A SECURITY SYSTEM OF A FACILITY

(71) Applicant: Honeywell International Inc., Charlotte, NC (US)

(72) Inventor: Manjunatha Divakara, Tumkur (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 386 days.

(21) Appl. No.: 17/873,057

(22) Filed: Jul. 25, 2022

(65) Prior Publication Data
US 2024/0031250 A1   Jan. 25, 2024

(51) Int. Cl.
*H04L 41/5009* (2022.01)
*H04L 9/40* (2022.01)

(52) U.S. Cl.
CPC .......... *H04L 41/5009* (2013.01); *H04L 63/20* (2013.01)

(58) Field of Classification Search
CPC ..... H04L 67/10; H04L 63/1441; H04L 63/08; H04L 63/1433; H04L 63/102; H04L 63/1416; H04L 63/10; H04L 41/5009; H04L 63/1425; H04L 63/20; H04L 63/12
See application file for complete search history.

(56) References Cited

U.S. PATENT DOCUMENTS

| 7,644,019 B2 | 1/2010 | Woda et al. |
| 9,456,190 B2 | 9/2016 | Liu et al. |
| 9,479,562 B2 | 10/2016 | Funge et al. |
| 9,734,693 B2 | 8/2017 | McKinley et al. |
| 9,767,677 B1* | 9/2017 | Paulin ................. G08B 25/005 |
| 9,819,972 B1 | 11/2017 | Vantalon et al. |
| 10,021,249 B2 | 7/2018 | McArdle et al. |

(Continued)

FOREIGN PATENT DOCUMENTS

| EP | 2128834 A1 | 12/2009 |
| EP | 3101636 A1 | 12/2016 |

OTHER PUBLICATIONS

Whitepaper, "Utility Value of COM-SUR™ for Airports", 21 pages, Hayagriva Software Ltd; Mumbai, India, document last updated Nov. 3, 2021.

(Continued)

*Primary Examiner* — Ninos Donabed
(74) *Attorney, Agent, or Firm* — Seager, Tufte & Wickhem, LLP

(57) ABSTRACT

A method for identifying performance issues with service providers includes storing one or more service level thresholds for each of the service providers, that define at least in part an expected service level for the service provided by the corresponding service provider. During operation of the security system, one or more notifications generated by the security system are received. One or more of the service level parameters may be compared with one or more of the service level thresholds to determine when the service provided by one or more of the service providers falls below the corresponding expected service level. A notification is sent to an operator of the security system when the service provided by one or more of the service providers falls below the corresponding expected service level.

16 Claims, 11 Drawing Sheets

(56) References Cited

U.S. PATENT DOCUMENTS

| | | | |
|---|---|---|---|
| 10,541,928 | B2 | 1/2020 | Shih et al. |
| 10,568,524 | B2 | 2/2020 | Justin et al. |
| 10,866,838 | B2 | 12/2020 | Chen et al. |
| 11,128,832 | B1 | 9/2021 | Klein |
| 12,062,278 | B2 * | 8/2024 | Subramanian .... G06F 18/24765 |
| 2002/0039352 | A1 | 4/2002 | El-Fekih et al. |
| 2006/0245369 | A1 * | 11/2006 | Schimmelpfeng ...... H04L 43/08 370/255 |
| 2007/0057784 | A1 * | 3/2007 | Govindaraj .......... G08B 26/008 340/541 |
| 2009/0254355 | A1 | 10/2009 | Chou et al. |
| 2012/0035942 | A1 | 2/2012 | Graupner et al. |
| 2012/0041858 | A1 | 2/2012 | Lewis |
| 2014/0067448 | A1 | 3/2014 | Joshi et al. |
| 2015/0085115 | A1 | 3/2015 | Sternberg et al. |
| 2016/0344595 | A1 * | 11/2016 | Jain ..................... H04L 67/1008 |
| 2017/0061783 | A1 * | 3/2017 | Nalukurthy .......... G08B 29/186 |
| 2018/0004948 | A1 * | 1/2018 | Martin ................ H04L 63/1425 |
| 2018/0062972 | A1 * | 3/2018 | Rangappagowda .......................... H04L 43/0876 |
| 2018/0284737 | A1 | 10/2018 | Cella et al. |
| 2020/0210965 | A1 * | 7/2020 | Garber .................. G06Q 10/04 |
| 2022/0182601 | A1 | 6/2022 | Kondamari et al. |
| 2023/0274182 | A1 * | 8/2023 | Alexander ............. G06N 20/00 706/12 |

OTHER PUBLICATIONS

Whitepaper, "Utility Value of COM-SUR™ for the Banking Sector", 19 pages, Hayagriva Software Ltd; Mumbai, India, document last updated Nov. 3, 2021.

Whitepaper, "Utility Value of COM-SUR™ for Hospitals and Other Medical Facilities," 19 pages, Hayagriva Software Ltd; Mumbai, India, document last updated Nov. 3, 2021.

Whitepaper, "Utility Value of COM-SUR™ in Enhancing Occupational Safety and Health," 20 pages, Hayagriva Software Ltd; Mumbai, India, document last updated Nov. 3, 2021.

Whitepaper, "Utility Value of COM-SUR™ for the Private Security Industry," 19 pages, Hayagriva Software Ltd; Mumbai, India, document last updated Nov. 3, 2021.

Whitepaper, "Utility Value of COM-SUR™ for the Retail Sector," 24 pages, Hayagriva Software Ltd; Mumbai, India, document last updated Nov. 3, 2021.

Extended European Search Report, EP Application No. 21206754.0, mailed Apr. 20, 2022 (10 pages).

India First Office Action, India Patent Office, IN Application No. 202011053390, mailed Jul. 7, 2022. (8 pages).

Gupta, "Machine Data: Unlocking Insights for Efficient Operations," Motadata, 3 pages, Accessed Mar. 17, 2022.

Waqas, "Could Machine Learning Help with Alarms Management in Oil & Gas Industry," 6 pages, Accessed Mar. 17, 2022.

Extended European Search Report, European Patent Office, EP Application No. 23184849.0, Jan. 3, 2024 (7 pages).

* cited by examiner

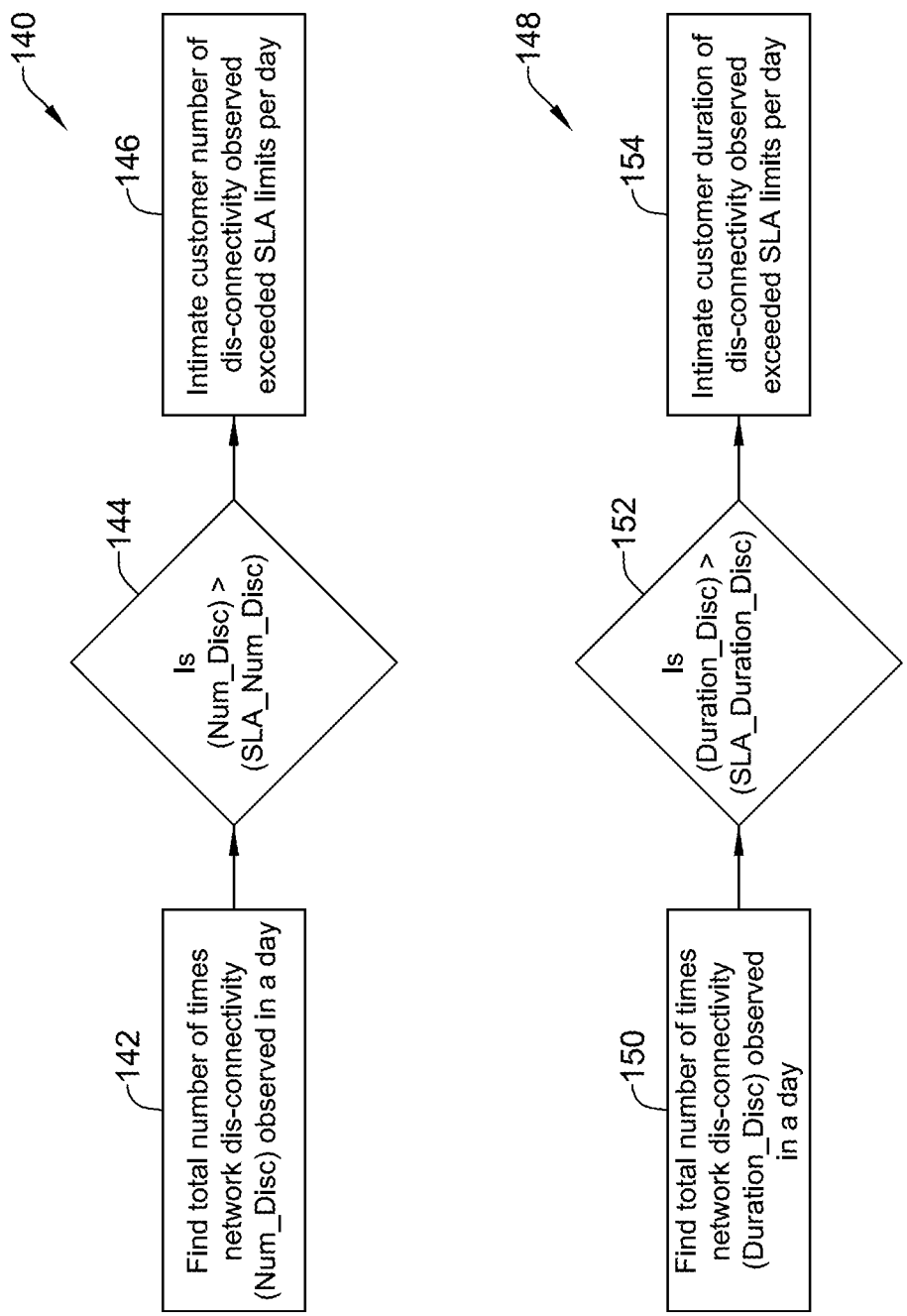

SYSTEM AND METHOD FOR IDENTIFYING PERFORMANCE ISSUES WITH SERVICE PROVIDERS THAT PROVIDE A SERVICE TO SUPPORT A SECURITY SYSTEM OF A FACILITY

TECHNICAL FIELD

The present disclosure relates generally to security systems. More particularly, the present disclosure relates to identifying performance issues with service providers that support security systems.

BACKGROUND

A variety of security systems are used to monitor and protect a variety of facilities and areas. While a security system may include a number of security sensors and other installed components of the security system that may influence the performance of the security system, it will be appreciated that the overall performance of the security system may also depend in part on the performance of service providers that support the operation of the security system. The manufacturer and/or installer of the security system often retain some responsibility for the performance of the installed components of the security system post installation. However, the manufacturer and/or installer often have little control over the performance of the service providers that support the operation of the security system. What would be desirable are systems and methods that facilitate identifying performance issues with the service providers that support the operation of the security system so that the source of the performance issues may be properly identified and efficiently addressed.

SUMMARY

The present disclosure relates to security systems and more particularly to identifying performance issues with service providers that support security systems. An example may be found in a method for identifying performance issues with one or more service providers that provide a service to support a security system of a facility. The illustrative method includes storing one or more service level thresholds for each of the one or more service providers, each of the one or more service level thresholds defining at least in part an expected service level for the service provided by the corresponding service provider. During operation of the security system, one or more notifications generated by the security system are received. A determination is made as to one or more service level parameters based at least in part on the one or more notifications generated by the security system. One or more of the service level parameters are compared with one or more of the service level thresholds to determine when the service provided by one or more of the service providers falls below the corresponding expected service level. A notification is sent to an operator of the security system when the service provided by one or more of the service providers falls below the corresponding expected service level. Example service providers may include a first responder servicer provider, a security operator service provider, a maintenance service provider, and an Internet service provider. It is contemplated that the services provided by such service providers may include services provided by the facility, an occupant of the facility and/or services provided by a separate service provider entity.

Another example may be found in a non-transitory computer readable medium storing instructions that when executed by one or more processors cause the one or more processors to store one or more service level thresholds for each of one or more service providers that provide a service to support a security system of a facility, each of the one or more service level thresholds defining at least in part an expected service level for the service provided by the corresponding service provider. The one or more processors are caused to receive one or more notifications generated by the security system, to determine one or more service level parameters based at least in part on the one or more notifications generated by the security system, and to compare one or more of the service level parameters with one or more of the service level thresholds to determine when the service provided by one or more of the service providers falls below the corresponding expected service level. The one or more processors are caused to send a notification to an operator of the security system when the service provided by one or more of the service providers falls below the corresponding expected service level.

Another example may be found in a system for identifying performance issues with one or more service providers that provide a service to support a security system of a facility. The system includes a memory for storing one or more service level thresholds for each of the one or more service providers, each of the one or more service level thresholds defining at least in part an expected service level for the service provided by the corresponding service provider. A controller is operatively coupled to the memory. The controller is configured to receive one or more notifications generated by the security system, determine one or more service level parameters based at least in part on the one or more notifications generated by the security system, compare one or more of the service level parameters with one or more of the service level thresholds to determine when the service provided by one or more of the service providers falls below the corresponding expected service level, and send a notification to an operator of the security system when the service provided by one or more of the service providers falls below the corresponding expected service level.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIGS. 10A and 10B are flow diagrams showing illustrative methods for determining Internet provider SLA adherence.

Figure 1:
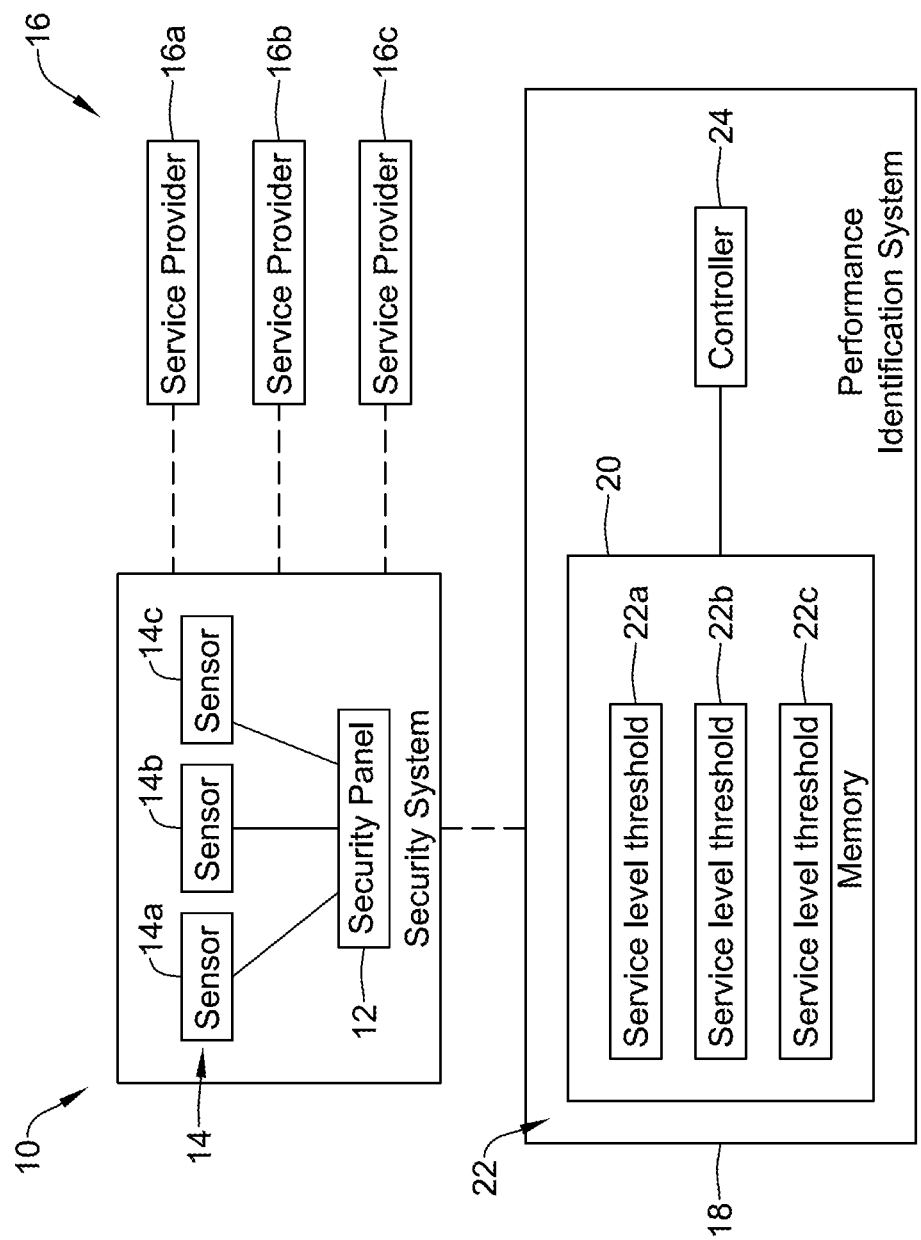
FIG. 1 is a schematic block diagram of an illustrative security system and a corresponding performance identification system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative security system 10. The illustrative security system 10 may be deployed within a facility in order to provide security within the facility. The illustrative security system 10 includes a security panel 12 that is operably coupled with a plurality of sensors 14, individually labeled as 14a, 14b and 14c. While a total of three sensors 14 are shown, it will be appreciated that this is merely illustrative, as the security system 10 may include any number of sensors 14, and in some cases may includes tens, hundreds or even thousands of sensors 14, depending on the size and complexity of the security system 10. The sensors 14 may include a variety of different types of security sensors, such as but not limited to door open sensors, window open sensors, motion sensors, glass break detectors, and the like.

A number of service providers 16, individually labeled as 16a, 16b and 16c, provide various support services to the security system 10. While a total of three service providers 16 are shown, this is merely illustrative, as the security system 10 may utilize any number of service providers 16. Each of the service providers 16 may individually represent any of a variety of different service providers such as but not limited to first responder service providers that provide first responder services in response to one or more first responder notifications generated by the security system 10 or security operator service providers that provide security operator services to the security system 10 including responding to one or more operator notifications generated by the security system 10.

Another example of a service provider 16 include maintenance service providers that provide maintenance services for the security system 10, such as responding to one or more maintenance notifications generated by the security system 10. Another example of service providers 16 include an Internet service provider that provide Internet services for the security system 10. Another example of a service provider 16 is a utility power service that provides utility power services to the security system 10. This may include providing electrical power, for example. Another example of a service provider 16 is an inspection service provider that provides inspection services to the security system 10. These are just examples.

The manufacturer and/or installer of the security system 10 often retain some responsibility for the performance of the installed components (e.g. sensors 14 and security panel 12) of the security system 10 post installation. However, the manufacturer and/or installer often have little control over the performance of the service providers 16 that support the operation of the security system 10. In FIG. 1, a performance identification system 18 is operably coupled with the security system 10. The performance identification system 18 may facilitate identifying performance issues with one or more of the service providers that support the operation of the security system 10 so that the source of the performance issues may be properly identified and efficiently addressed. The performance identification system 18 may be integrated into the security system 10. The performance identification system 18 may be a stand-alone system that is distinct from, yet in communication with, the security system 10. The performance identification system 18 may be configured to monitor the performance of the various service providers 16 and to determine when one or more of various service providers 16 are failing to meet expectations for that particular service provider 16. In some cases, the performance identification system 18 relies at least in part upon various service level thresholds in determining when one or more of the service providers 16 are failing to meet expectations.

The illustrative performance identification system 18 includes a memory 20 that is configured to store a number of service level thresholds 22, individually labeled as 22a, 22b and 22c. Each service level threshold 22 defines at least in part an expected service level for whatever service is provided by a particular service provider 16. While a total of three service level thresholds 22 are shown, this is merely illustrative as the memory 20 may be configured to store any number of service level thresholds 22. In some cases, the memory 20 may store at least one service level threshold 22 for each of the service providers 16. In some cases, at least some of the service providers 16 may be tied to two or more service level thresholds 22.

The illustrative performance identification system 18 includes a controller 24 that is operatively coupled with the memory 20. The controller 24 is configured to receive one or more notifications generated by the security system 10 and to determine one or more service level parameters that are based at least in part on the one or more notifications generated by the security system 10. The controller 24 is configured to compare one or more of the service level parameters with one or more of the service level thresholds 22 to determine when the service provided by one or more of the service providers 16 falls below the corresponding expected service level. In some cases, the controller 24 is configured to send a notification to an operator of the security system 10 when the service provided by one or more of the service providers 16 falls below the corresponding expected service level.

Figure 2:
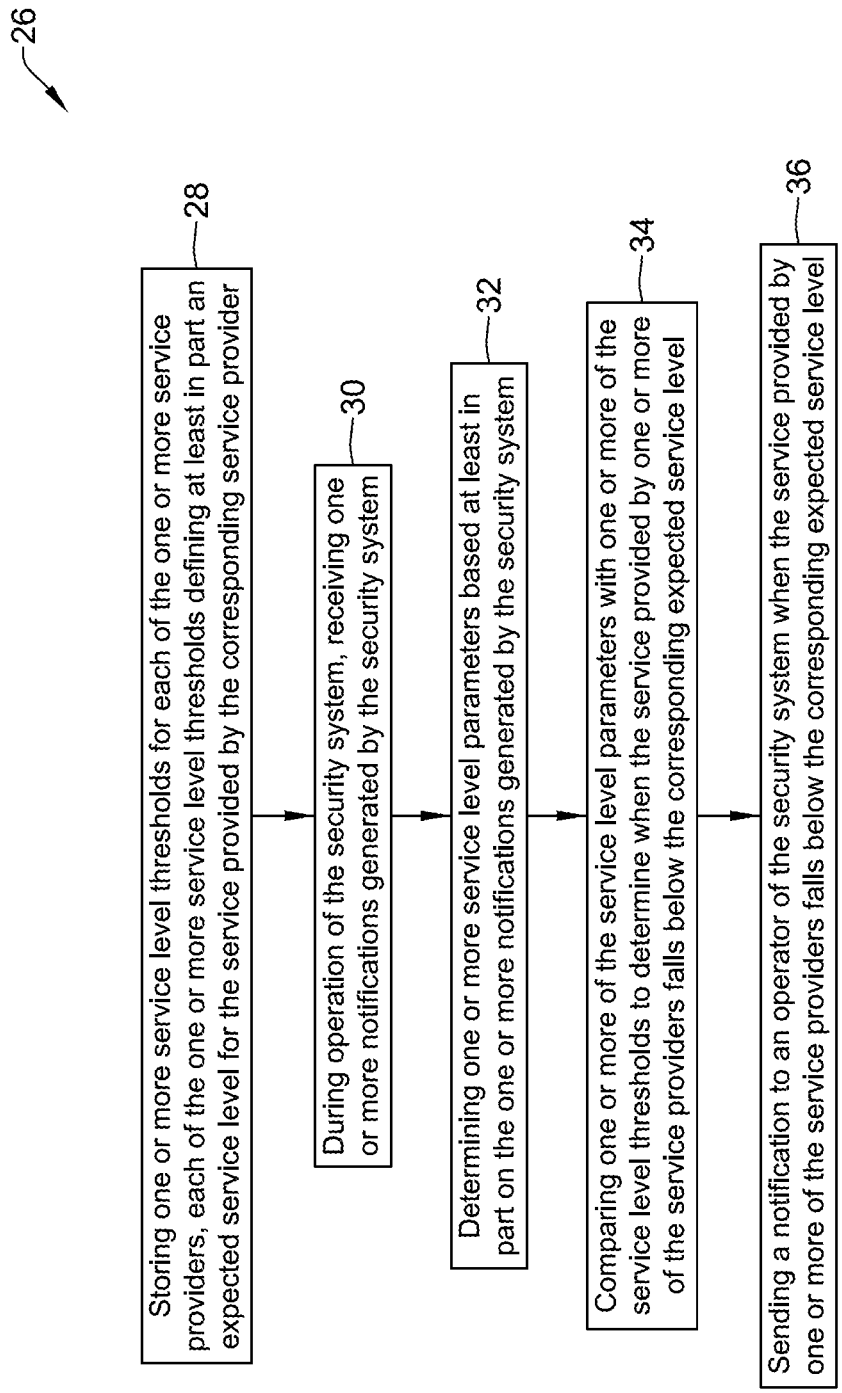
FIG. 2 is a flow diagram showing an illustrative method for identifying performance issues with one or more service providers that provide a service to support a security system such as the security system of FIG. 1.

FIG. 2 is a flow diagram showing an illustrative method 26 for identifying performance issues with one or more service providers (such as the service providers 16) that provide a service to support a security system (such as the security system 10) of a facility. The illustrative method 26 includes storing one or more service level thresholds for each of the one or more service providers, each of the one or more service level thresholds defining at least in part an expected service level for the service provided by the corresponding service provider, as indicated at block 28. During operation of the security system, one or more notifications generated by the security system are received, as indicated at block 30. One or more service level parameters are determined based at least in part on the one or more notifications generated by the security system, as indicated at block 32. In some cases, one or more of the service level thresholds may be dynamic based on one or more current conditions, and in some cases may be determined using Artificial Intelligence (AI). One or more of the service level parameters are compared with one or more of the service level thresholds to determine when the service provided by one or more of the service providers falls below the corresponding expected service level, as indicated at block 34. A notification is sent to an operator of the security system when the service provided by one or more of the service providers falls below the corresponding expected service level, as indicated at block 36.

In some cases, the one or more service providers may include a first responder service provider for providing first responder services in response to one or more first responder notifications generated by the security system, and the one or more service level thresholds for the first responder services may include an expected acknowledgment time to acknowledge one or more of the first responder notifications generated by the security system and/or an expected response time to respond to one or more of the first responder notifications generated by the security system. The first responder service provider may be a fire department, a police department, an ambulance service, an internal fire brigade and/or any other first responder service provider.

As another example, the one or more service providers may include a security operator service provider for providing security operator services to the security system including responding to one or more operator notifications generated by the security system, and the one or more service level thresholds for the security operator services may include an expected response time to respond to one or more of the operator notifications generated by the security system. The one or more service level thresholds for the security operator services may include an expected acknowledgement time to acknowledge one or more of the operator notifications generated by the security system. In another example, the one or more service providers may include a maintenance service provider for providing maintenance services for the security system including responding to one or more maintenance notifications generated by the security system. The one or more service level thresholds for the maintenance services may include an expected maintenance time to respond to one or more of the maintenance notifications generated by the security system. These are just examples.

Figure 3:
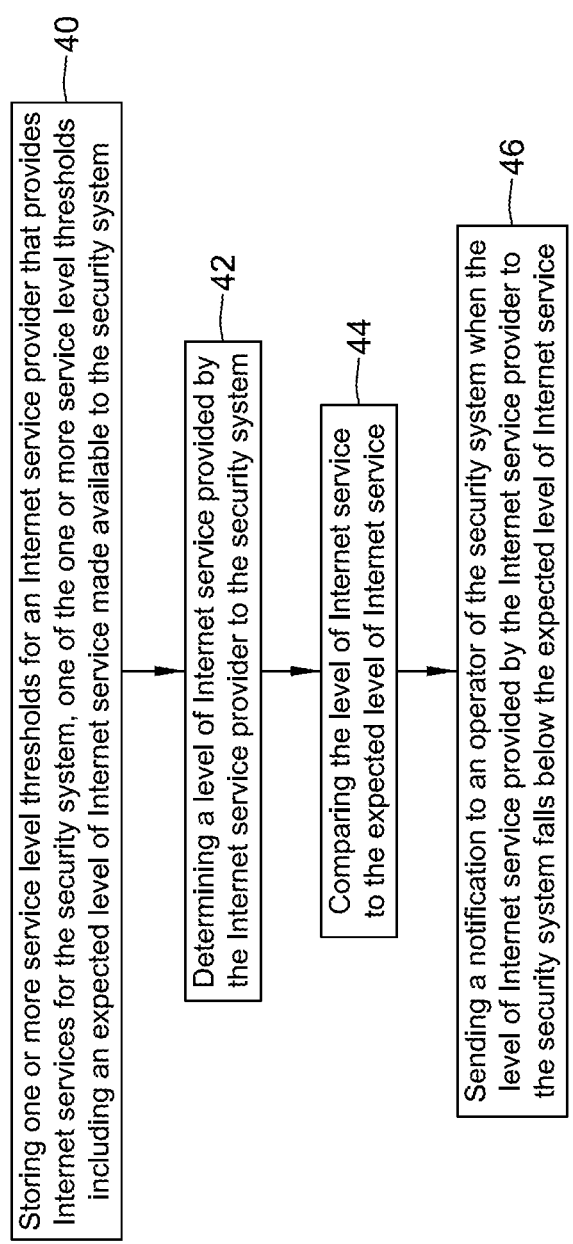
FIG. 3 is a flow diagram showing an illustrative method for identifying performance issues with one or more service providers that provide a service to support a security system such as the security system of FIG. 1.

FIG. 3 is a flow diagram showing an illustrative method 38 for identifying performance issues with one or more service providers (such as the service providers 16) that provide a service to support a security system (such as the security system 10) of a facility. In some cases, the one or more service providers include an Internet service provider for providing Internet services for the security system (e.g. to provide communication between a local security system controller and a cloud service), and the one or more service level thresholds for the Internet services include an expected level of Internet service made available to the security system, as indicated at block 40. The expected level of Internet service may include, for example, having less than a threshold number of Internet disconnects over a predetermined time period. The expected level of Internet Service may include having less than a threshold duration of Internet disconnects over a predetermined time period. In some cases, the expected level of Internet Service may include one or more of providing greater than a threshold speed, providing greater than a threshold Quality of Service (QoS) and/or providing less than a threshold error rate over a predetermined period of time. A level of Internet service provided by the Internet service provider to the security system is determined, as indicated at block 42. The level of Internet service is compared to the expected level of Internet service, as indicated at block 44. A notification is sent to an operator of the security system when the level of Internet service provided by the Internet service provider to the security system falls below the expected level of Internet Service, as indicated at block 46.

Figure 4:
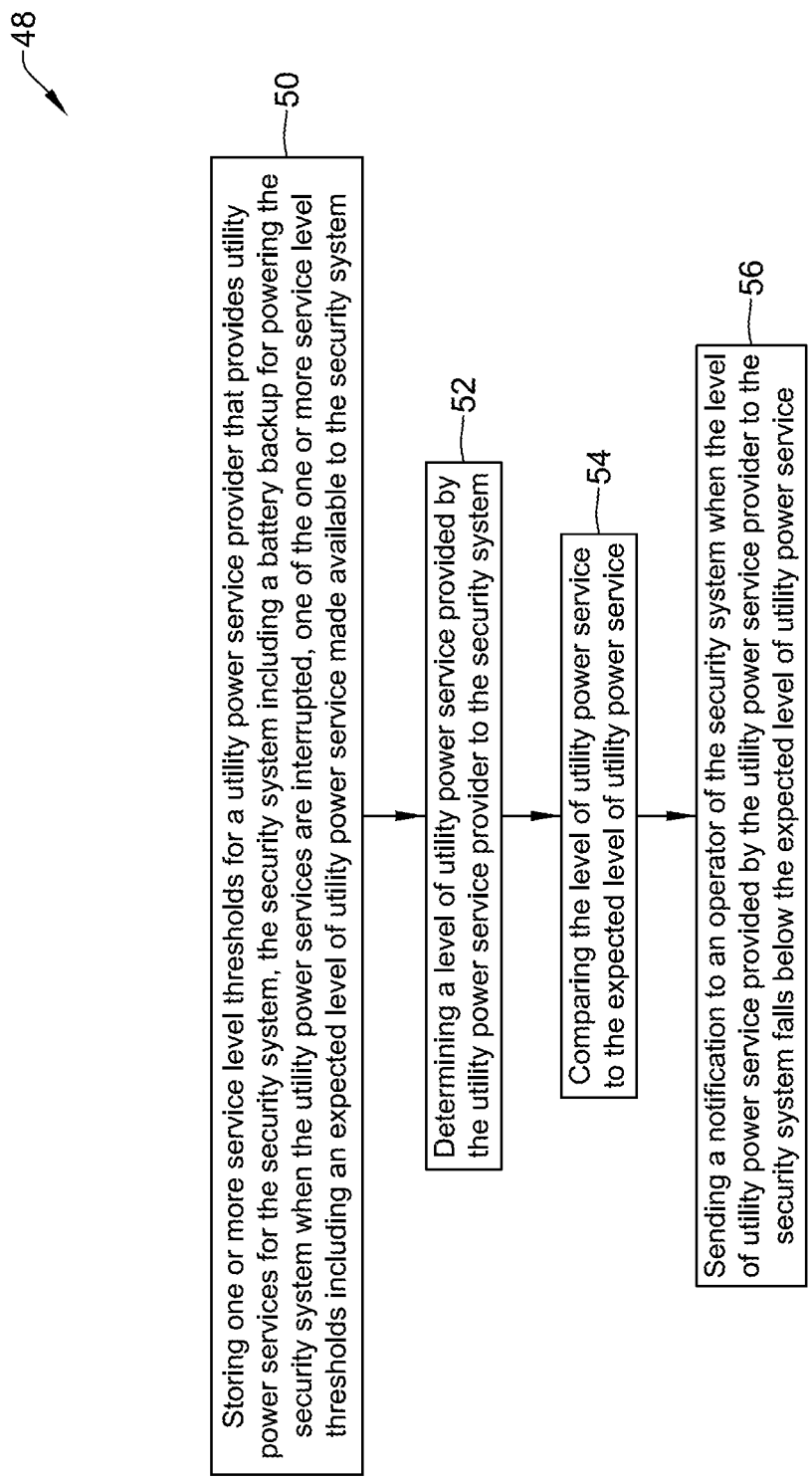
FIG. 4 is a flow diagram showing an illustrative method for identifying performance issues with one or more service providers that provide a service to support a security system such as the security system of FIG. 1.

FIG. 4 is a flow diagram showing an illustrative method 48 for identifying performance issues with one or more service providers (such as the service providers 16) that provide a service to support a security system (such as the security system 10) of a facility. In some cases, the one or more service provides include a utility power service provider for providing utility power services for the security system. In some cases, the security system includes a battery backup for powering the security system when the utility power services are interrupted. One of the one or more service level thresholds may include an expected level of utility power service made available to the security system, as indicated at block 50. A level of utility power service provided by the utility power service provider to the security system is determined, as indicated at block 52. The level of utility power service is compared to the expected level of utility power service, as indicated at block 54. A notification is sent to an operator of the security system when the level of utility power service provided by the utility power service provider to the security system falls below the expected level of utility power service, as indicated at block 56. In some cases, the expected level of utility power service may include having less than a threshold number of power interruptions over a predetermined time period. Determining the level of utility power service provided by the utility power service provider to the security system may include counting a number of times that the security system switches to battery backup over the predetermined time period, for example.

Figure 5:
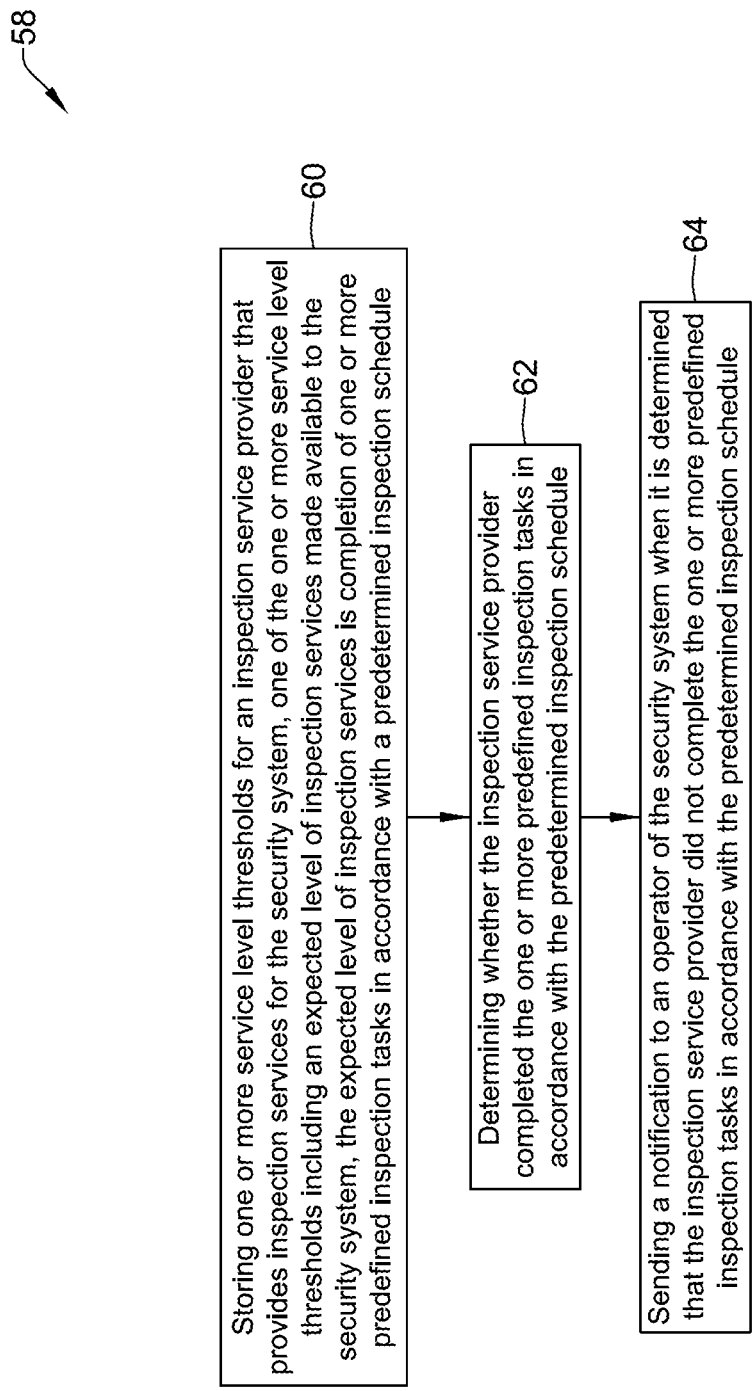
FIG. 5 is a flow diagram showing an illustrative method for identifying performance issues with one or more service providers that provide a service to support a security system such as the security system of FIG. 1.

FIG. 5 is a flow diagram showing an illustrative method 58 for identifying performance issues with one or more service providers (such as the service providers 16) that provide a service to support a security system (such as the security system 10) of a facility. In some cases, the one or more service provides include an inspection service provider for providing inspection services for the security system. One of the one or more service level thresholds may include an expected level of inspection services made available to the security system. The expected level of inspection services may include completion of one or more predefined inspection tasks in accordance with a predetermined inspection schedule (such as in accordance with a Standard Operating Procedure (SOP)), as indicated at block 60. The illustrative method 58 includes determining whether the inspection service provider completed the one or more predefined inspection tasks in accordance with the predetermined inspection schedule, as indicated at block 62.

A notification is sent to an operator of the security system when it is determined that the inspection service provider did not complete the one or more predefined inspection tasks in accordance with the predetermined inspection schedule, as indicated at block 64. In some cases, the one or more predefined inspection tasks may include one or more of a walk test of predetermined devices (e.g. trigger each of the sensors) of the security system, a wiring check of predetermined devices of the security system, a manual reporting path check for predetermined devices of the security system, and a manual maintenance mode check for predetermined devices of the security system. The predetermined inspections may correspond to one or more of a Standard Operating Procedure (SOP) and/or regulatory requirements.

Figure 6:
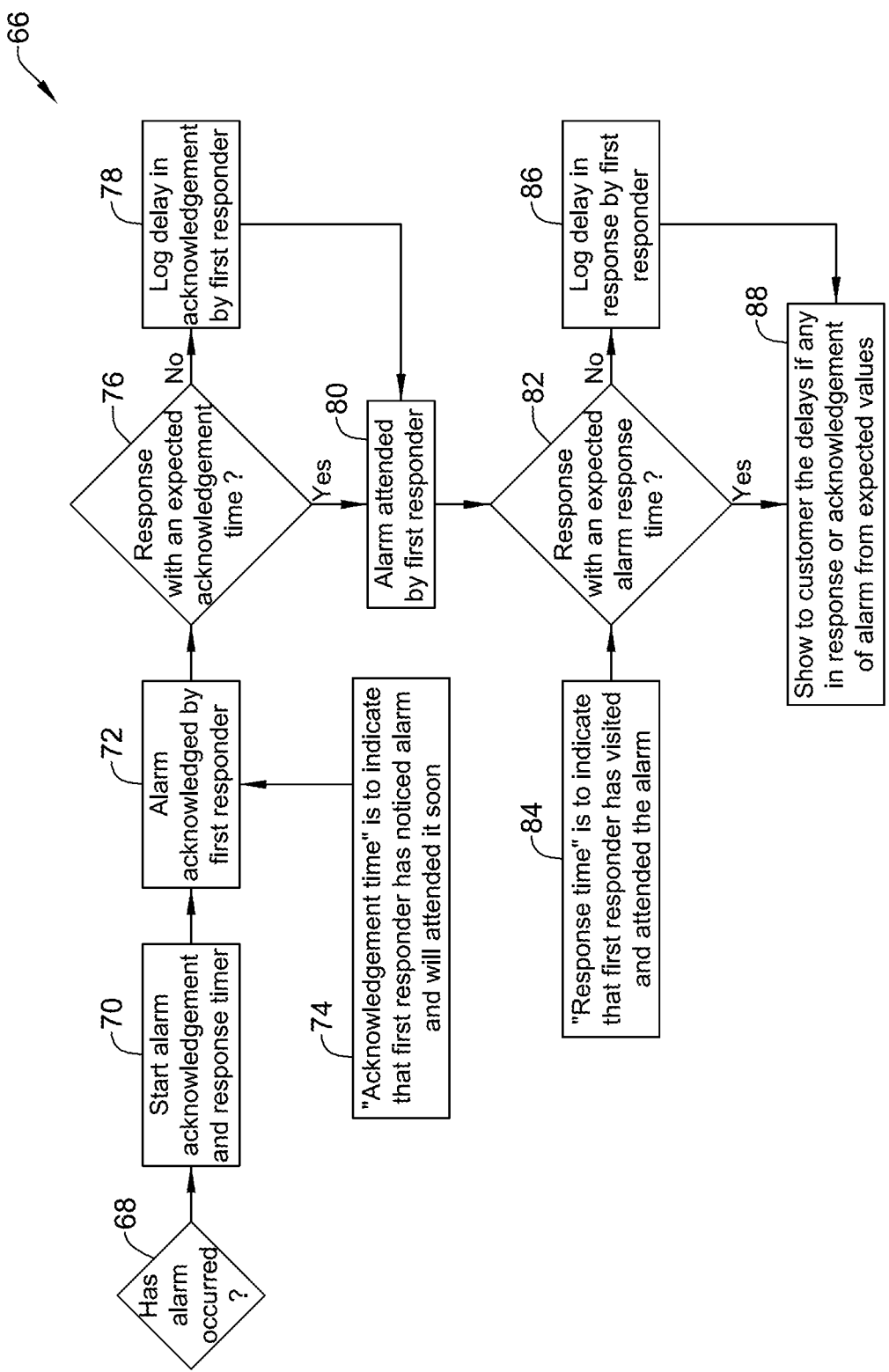
FIG. 6 is a flow diagram showing an illustrative method for determining first responder operational efficiency.

FIG. 6 is a flow diagram showing an illustrative method 66 for determining first responder operational efficiency. The illustrative method begins with determining if an alarm has occurred, as indicated at decision block 68. At block 70, an alarm acknowledgement response timer is started. At block 72, the alarm is acknowledged by a first responder. As indicated at block 74, "acknowledgement time" indicates that the first responder is aware of the alarm. At decision block 76, a determination is made as to whether the first responder responded within the expected acknowledgement time. If not, control passes to block 78 and the delay in acknowledgement is logged. Control then passes to block 80, where the alarm is responded to by the first responder (e.g. the first responder arrived on scene and responded to the alarm). If the first responder did respond within the expected acknowledgement time, control passes to block 80.

At decision block 82, a determination is made as to whether the first responder responded to the alarm within an expected period of time. As indicated at block 84, "response time" indicates that the first responder has attended to the alarm. If the first responder did not respond to the alarm within the expected period of time, control passes to block 86 and the delay is logged. Control then passes to block 88, where the results may be provided to an operator of the security system (e.g. customer). If the first responder did respond to the alarm within the expected period of time, control passes to block 88.

Figure 7:
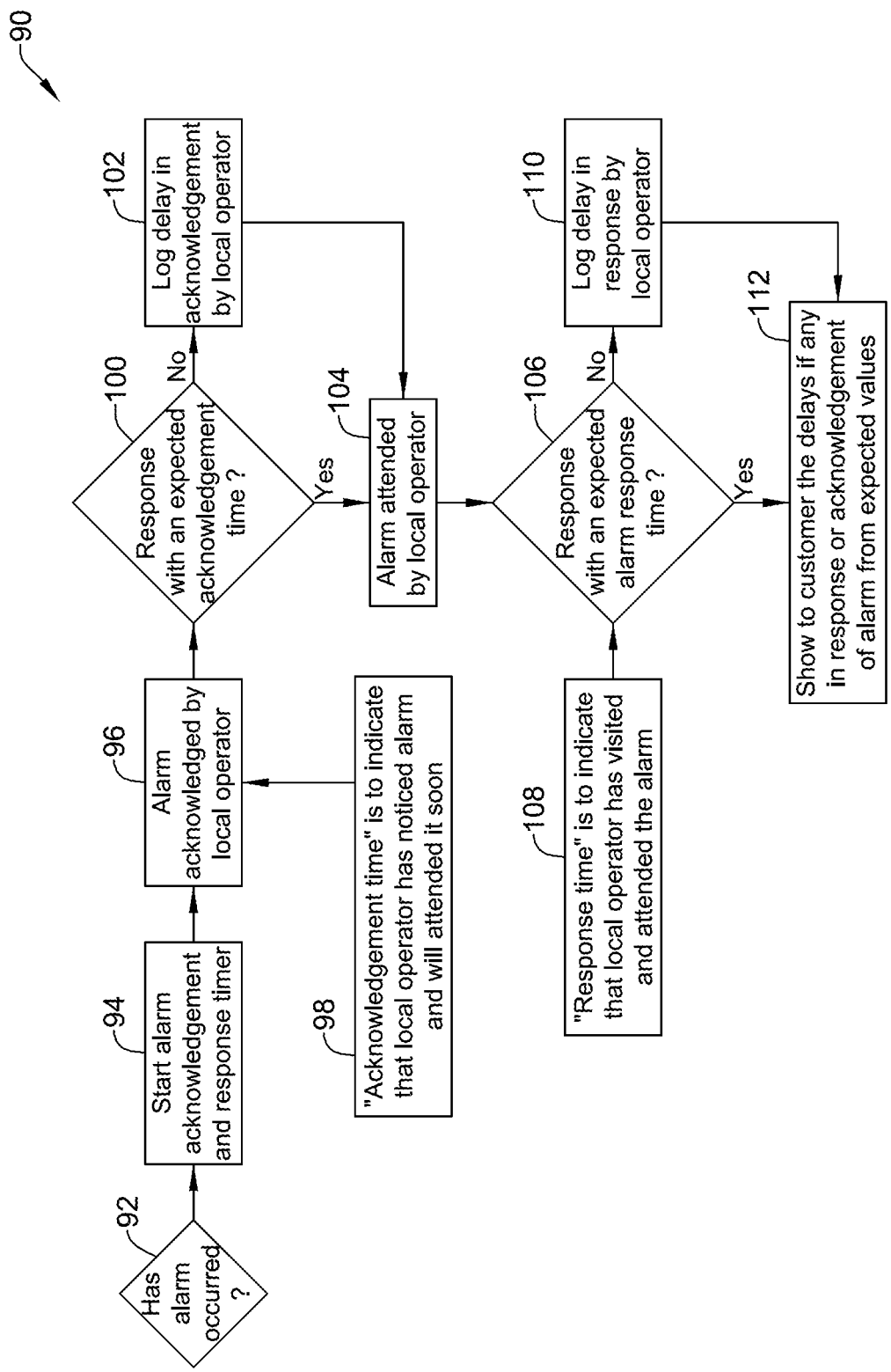
FIG. 7 is a flow diagram showing an illustrative method for determining local operator response efficiency.

FIG. 7 is a flow diagram showing an illustrative method 66 for determining local responder operational efficiency. The local responder may correspond to, for example, a local fire brigade, a local medical team, a local security guard, a local maintenance person and/or any other local responder. The method begins with determining if an alarm has occurred, as indicated at decision block 92. At block 94, an alarm acknowledgement response timer is started. At block 96, the alarm is acknowledged by a first responder. As indicated at block 98, "acknowledgement time" indicates that the local responder is aware of the alarm. At decision block 100, a determination is made as to whether the first responder responded within the expected acknowledgement time. If not, control passes to block 102 and the delay in acknowledgement is logged. Control then passes to block 104, where the alarm is responded to by the local responder. If the local responder did respond within the expected acknowledgement time, control passes to block 104.

At decision block 106, a determination is made as to whether the local responder responded to the alarm within an expected period of time. As indicated at block 108, "response time" indicates that the local responder has attended to the alarm. If the local responder did not respond to the alarm within the expected period of time, control passes to block 110 and the delay is logged. Control then passes to block 112, where the results may be provided to an operator of the security system (e.g. customer). If the first responder did respond to the alarm within the expected period of time, control passes to block 110.

Figure 8:
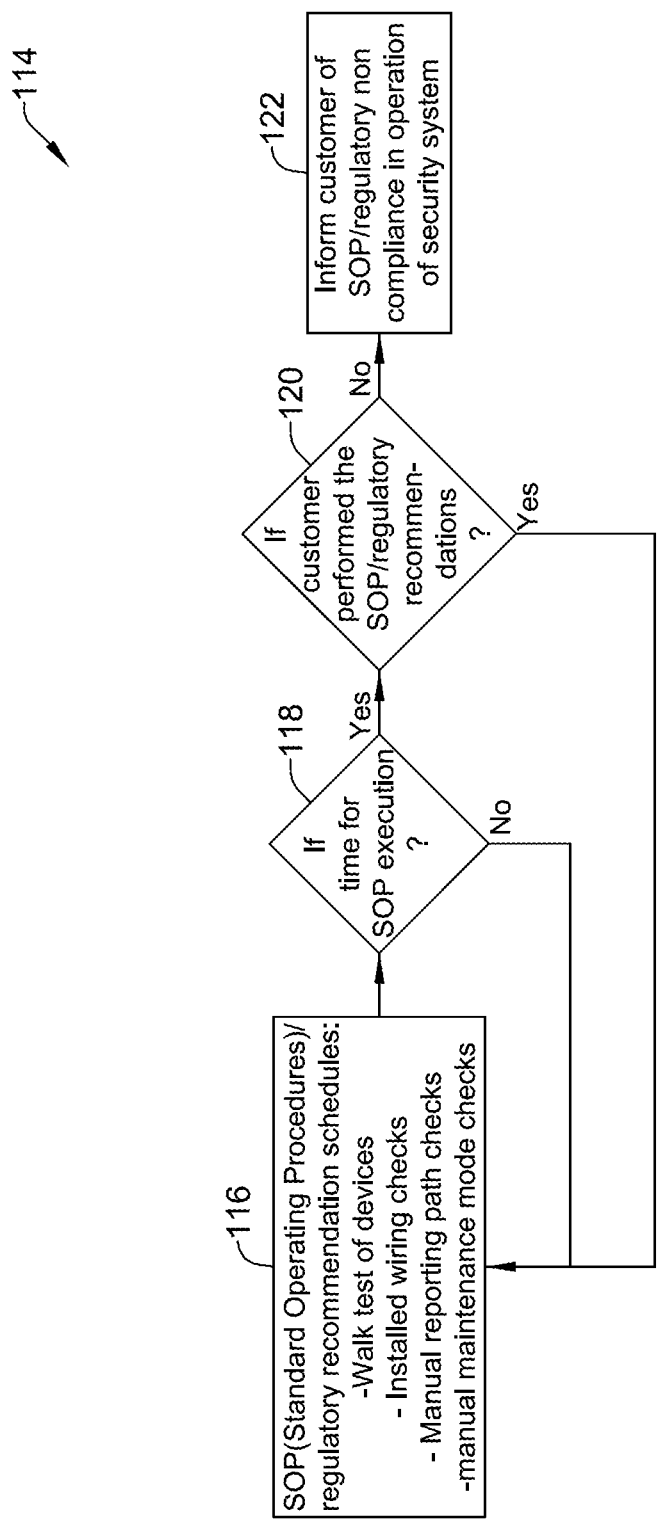
FIG. 8 is a flow diagram showing an illustrative method for determining SOP/Regulatory adherence.

FIG. 8 is a flow diagram showing an illustrative method 114 for determining SOP/Regulatory adherence. The method 114 begins at block 116, which outlines the SOP (Standard Operating Procedure) for a variety of different processes. Examples include walk tests of devices, installed wiring checks, manual reporting path checks and manual maintenance mode checks. At decision block 118, a determination is made as to whether it is time for one or more SOP execution. If not, control reverts to block 116. If so, however, control passes to decision block 120, where a determination is made as to whether the customer met the SOP/Regulatory requirements. If not, control passes to block 122 and the non-compliance is reported. If so, however, control reverts to block 116.

Figure 9A:
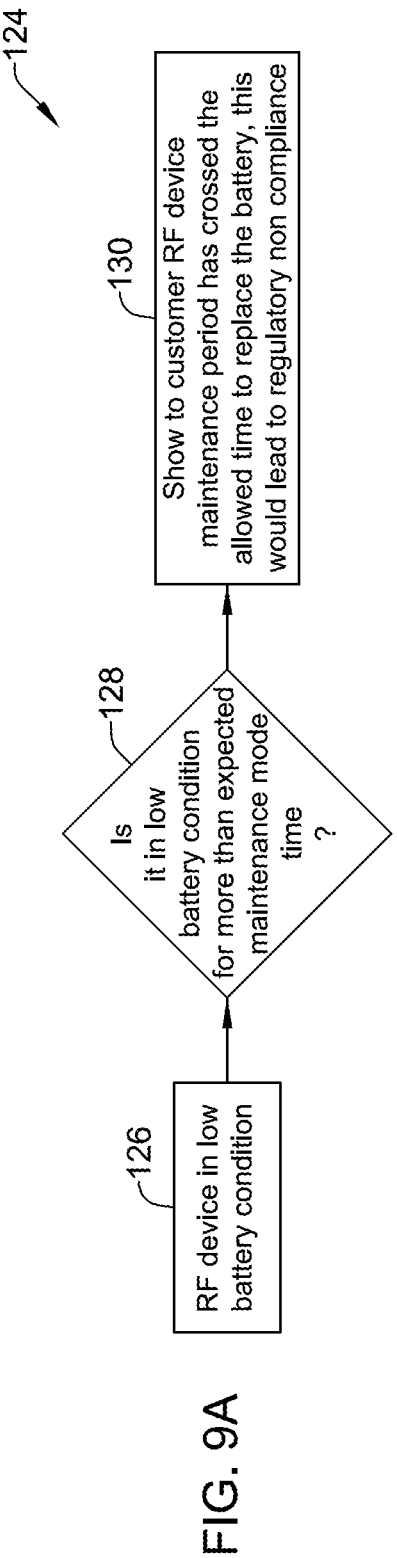
FIGS. 9A and 9B are flow diagrams showing illustrative methods for determining maintenance mode recovery time.
Figure 9B:
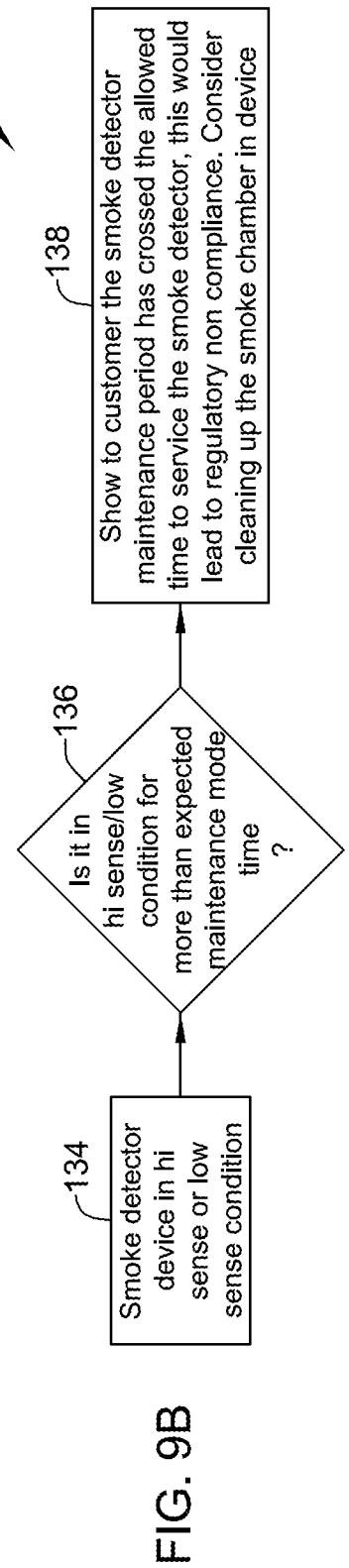

FIGS. 9A and 9B are flow diagrams showing illustrative methods for determining maintenance mode recovery time. FIG. 9A shows a method 124 that pertains to low battery conditions. At block 126, a security system device (e.g. sensor) is in a low battery condition. At decision block 128, a determination is made as to whether the device is in the low battery condition for more time than an expected maintenance mode time. If so, this is reported, as indicated at block 130. FIG. 9B shows a method 132 that pertains to a smoke detector. At block 134, a smoke detector is in a high sense or a low sense condition, which is undesirable. At decision block 136, a determination is made as to whether the smoke detector is in the high sense or the low sense condition for more than an expected maintenance mode time. If so, this is reported, as indicated at block 138, indicating that the expected service level of the maintenance service provider has fallen below the expected service level.

FIGS. 10A and 10B are flow diagrams showing illustrative methods for determining Internet service provider SLA (Service Level Agreement) adherence. FIG. 10A shows a method 140 that pertains to frequency of network connectivity issues. At block 142, a total number of connectivity issues (e.g. disconnects) is determined. At decision block 144, a determination is made as to whether the number of disconnects exceeds that allowed by the SLA (Service Level Agreement). If so, this is reported, as indicated at block 146. FIG. 10B shows a method 148 that pertains to duration of network connectivity issues. At block 150, a total duration of connectivity issues is determined (duration that the Interconnective was lost). At decision block 152, a determination is made as to whether the total duration of disconnect time exceeds that allowed by the SLA (Service Level Agreement). If so, this is reported, as indicated at block 154. In some cases, the expected level of Internet Service may include one or more of providing greater than a threshold speed, providing greater than a threshold Quality of Service (QoS) and/or providing less than a threshold error rate over a predetermined period of time. These are just examples.

Figure 11:
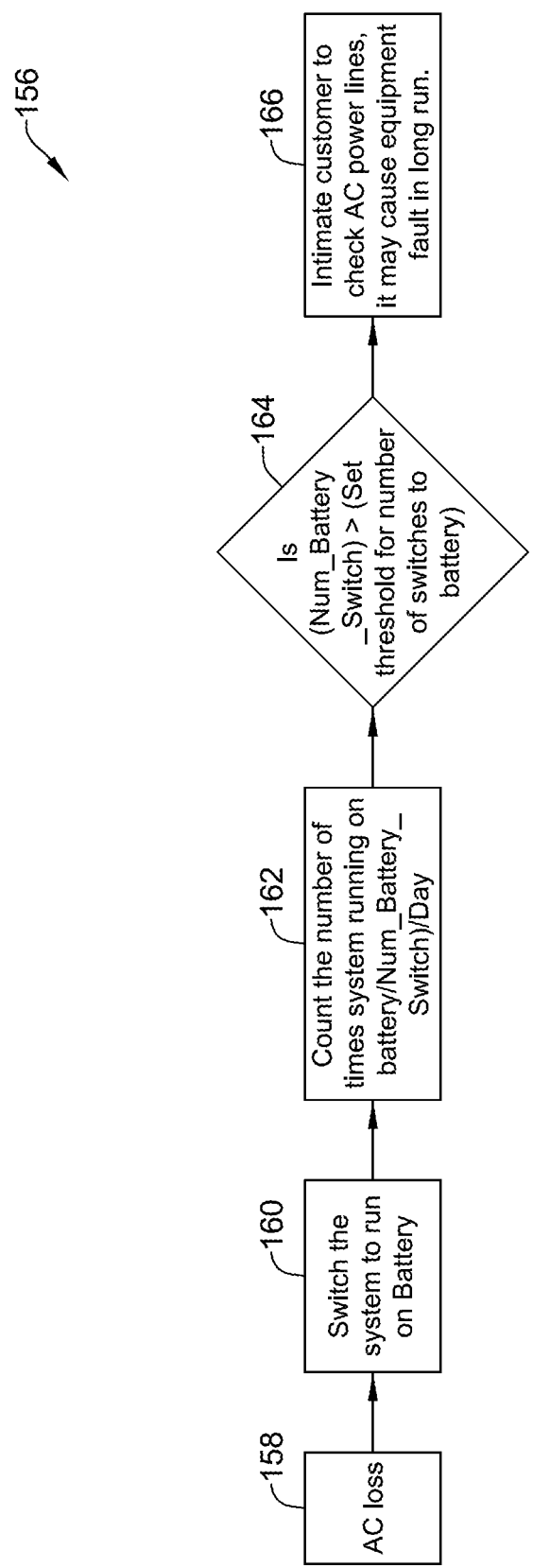
FIG. 11 is a flow diagram showing an illustrative method for determining utility power provider power fluctuations.

FIG. 11 is a flow diagram showing an illustrative method 156 for determining utility power provider service. At block 158, an Alternating Current (AC) loss is detected. At block 160, the security system switches to battery power in response. When power is restored by the utility, the security system switch back to utility power. At block 162, a count is made of the number of times that the security system has had to switch to battery power over a predetermined time period. At decision block 164, a determination is made as to whether the number of times has exceeded expectations. If so, control passes to block 166 and the operator (e.g. customer) is informed that they should conduct certain equipment checks and/or contact the utility. In some cases, the expected level of utility service may include one or more of less than a threshold amount of noise on the delivered power, less than a threshold amount of phase shift in the delivered power, less than a threshold amount of frequency shift in the delivered power, less than a threshold amount of amplitude shift in the delivered power and/or less than a threshold amount of harmonic distortion in the delivered power. These are just examples.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for identifying performance issues with one or more service providers that provide a service to support a physical security system of a facility including a utility power service provider that provides utility power services to the physical security system of the facility, wherein the physical security system includes a security panel that is operatively coupled to a plurality of security system sensors and is configured to monitor one or more physical areas of the facility, wherein the security system includes a battery backup for powering the security system when the utility power services to the physical security system of the facility are interrupted, the method comprising:

storing one or more service level thresholds, wherein the one or more service level thresholds for the utility power service provider include an expected level of utility power service that includes less than a threshold number of power interruptions to the security system over a predetermined time period;

determining a level of utility power service provided by the utility power service provider to the security system, including counting a number of times that the security system switches to battery backup over the predetermined time period;

comparing the level of utility power service to the expected level of utility power service;

determining when the level of utility power service provided by the utility power service provider to the security system falls below the expected level of utility power service; and sending a notification to an operator of the security system when the level of utility power service provided by the utility power service provider to the security system falls below the expected level of utility power service.

2. The method of claim 1, wherein the one or more service providers includes a first responder service provider, and wherein the one or more service level thresholds for the first responder services include an expected acknowledgment time to acknowledge one or more of the first responder notifications generated by the security system.

3. The method of claim 1, wherein the one or more service providers comprises a security operator service provider for providing security operator services to support the security system including responding to one or more operator notifications generated by the security system, and wherein the one or more service level thresholds for the security operator services include an expected response time for a security operator of the security operator service to respond to one or more of the operator notifications generated by the security system.

4. The method of claim 1, wherein the one or more service providers comprises a security operator service provider for providing security operator services to support the security system including responding to one or more operator notifications generated by the security system, and wherein the one or more service level thresholds for the security operator services include an expected acknowledgement time for a security operator of the security operator service to acknowledge one or more of the operator notifications generated by the security system.

5. The method of claim 1, wherein the one or more service providers includes a maintenance service provider for responding to one or more maintenance notifications generated by the security system, and wherein the one or more service level thresholds for the maintenance services include an expected maintenance time for a maintenance person of the maintenance service to respond to one or more of the maintenance notifications generated by the security system.

6. The method of claim 1, wherein the one or more service providers includes an Internet service provider, and wherein the one or more service level thresholds for the Internet services include an expected level of Internet service made available to the security system, the method comprising:

determining a level of Internet service provided by the Internet service provider to the security system;

comparing the level of Internet service to the expected level of Internet service; and sending a notification to an operator of the security system when the level of Internet service provided by the Internet service provider to the security system falls below the expected level of Internet Service.

7. The method of claim 6, wherein the expected level of Internet Service comprises less than a threshold number of Internet disconnects over a predetermined time period.

8. The method of claim 6, wherein the expected level of Internet Service comprises less than a threshold duration of Internet disconnects over a predetermined time period.

9. The method of claim 6, wherein the expected level of Internet Service comprises one or more of greater than a threshold speed, greater than a threshold Quality of Service (QOS) and less than a threshold error rate.

10. The method of claim 1, wherein the one or more service providers includes an inspection service provider, wherein the expected service level for the inspection service provider is for an inspector to complete one or more pre-defined on-site inspection tasks in accordance with a pre-determined inspection schedule, the method comprising:
   determining whether the inspection service provider completed the one or more predefined on-site inspection tasks in accordance with the predetermined inspection schedule; and
   sending a notification to an operator of the security system when it is determined that the inspection service provider did not complete the one or more predefined on-site inspection tasks in accordance with the predetermined inspection schedule.

11. The method of claim 10, wherein the one or more predefined on-site inspection tasks include one or more of:
   a walk test of predetermined devices of the security system including one or more of the plurality of security system sensors;
   a wiring check of predetermined devices of the security system;
   a manual reporting path check for predetermined devices of the security system; and
   a manual maintenance mode check for predetermined devices of the security system.

12. The method of claim 10, wherein the predetermined inspection schedule corresponds to one or more of a Standard Operating Procedure (SOP) schedule and a Regulatory defined schedule.

13. The method of claim 1, further comprising determining one or more of the service level thresholds using Artificial Intelligence (AI).

14. A non-transitory computer readable medium storing instructions that when executed by one or more processors cause the one or more processors to:
   store one or more service level thresholds for each of one or more service providers that provide a service to support a physical security system of a facility including a utility power service provider that provides utility power services to the physical security system of the facility, wherein the physical security system includes a security panel that is operatively coupled to a plurality of security system sensors and is configured to monitor one or more areas of the facility, wherein the security system includes a battery backup for powering the security system when the utility power services to the physical security system of the facility are interrupted, and wherein the one or more service level thresholds for the utility power service provider include an expected level of utility power service that includes less than a threshold number of power interruptions to the security system over a predetermined time period;
   receive one or more security system notifications generated by the security system;
   determine a level of utility power service provided by the utility power service provider to the security system, including counting a number of times that the security system switches to battery backup over the predetermined time period;
   compare the level of utility power service to the expected level of utility power service;
   determine when the level of utility power service provided by the utility power service provider to the security system falls below the expected level of utility power service; and
   send a notification to an operator of the security system when the level of utility power service provided by the utility power service provider to the security system falls below the expected level of utility power service.

15. The non-transitory computer readable medium of claim 14, wherein the instructions cause the one or more processors to determining one or more of the service level thresholds using Artificial Intelligence (AI).

16. A system for identifying performance issues with one or more service providers that provide a physical service to support a security system of a facility including a utility power service provider that provides utility power services to the physical security system of the facility, wherein the physical security system includes a security panel that is operatively coupled to a plurality of security system sensors and is configured to monitor one or more areas of the facility, the system comprising:
   a battery backup for powering the security system when the utility power services to the physical security system of the facility are interrupted;
   a memory for storing one or more service level thresholds, wherein the one or more service level thresholds for the utility power service provider include an expected level of utility power service that includes less than a threshold number of power interruptions to the security system over a predetermined time period;
   a controller operatively coupled to the memory and the battery backup, the controller configured to:
      determine a level of utility power service provided by the utility power service provider to the security system, including counting a number of times that the security system switches to battery backup over the predetermined time period;
      compare the level of utility power service to the expected level of utility power service;
      determine when the level of utility power service provided by the utility power service provider to the security system falls below the expected level of utility power service; and
      send a notification to an operator of the security system when the level of utility power service provided by the utility power service provider to the security system falls below the expected level of utility power service.

* * * * *